US008488225B2

(12) United States Patent
Yamada

(10) Patent No.: US 8,488,225 B2
(45) Date of Patent: Jul. 16, 2013

(54) OPTICAL SCANNING APPARATUS

(75) Inventor: Tsukasa Yamada, Tokyo (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 94 days.

(21) Appl. No.: 13/209,754

(22) Filed: Aug. 15, 2011

(65) Prior Publication Data
US 2012/0044556 A1 Feb. 23, 2012

(30) Foreign Application Priority Data

Aug. 23, 2010 (JP) ................................. 2010-186377

(51) Int. Cl.
*G02B 26/08* (2006.01)
(52) U.S. Cl.
USPC ...................................................... 359/214.1
(58) Field of Classification Search
USPC ...................... 359/214.1, 833–837
See application file for complete search history.

(56) References Cited

U.S. PATENT DOCUMENTS 6,340,230 B1 * 1/2002 Bryars et al. .................... 353/31
7,168,812 B2 1/2007 Yoshida et al.

FOREIGN PATENT DOCUMENTS

JP 2005-141152 6/2005

* cited by examiner

*Primary Examiner* — Euncha Cherry
(74) *Attorney, Agent, or Firm* — IPUSA, PLLC

(57) ABSTRACT

An optical scanning apparatus includes a laser source configured to irradiate a laser beam, a prism configured to reflect the laser beam irradiated from the laser source, a mirror configured to move the laser beam reflected from the prism by oscillating with respect to a predetermined axis and reflecting the laser beam reflected from the prism, the laser beam reflected from the prism being substantially perpendicular to a plane of the mirror in a case where the mirror is in a non-oscillating state, a waveplate positioned between the prism and the mirror and configured to polarize the laser beam reflected from the prism and the laser beam reflected from the mirror. The waveplate includes an end plane inclined with respect to the laser beam reflected from the prism to the mirror.

12 Claims, 6 Drawing Sheets

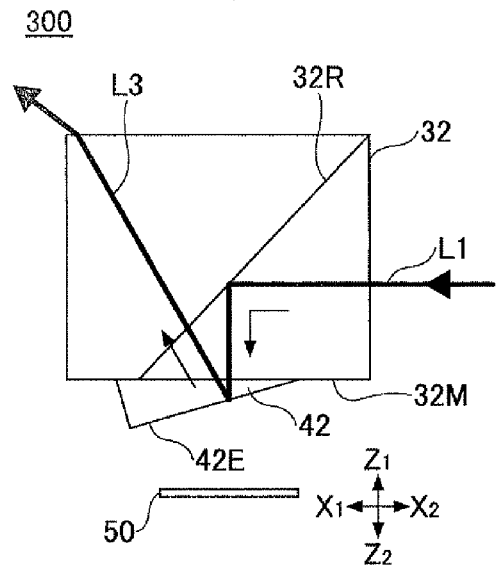
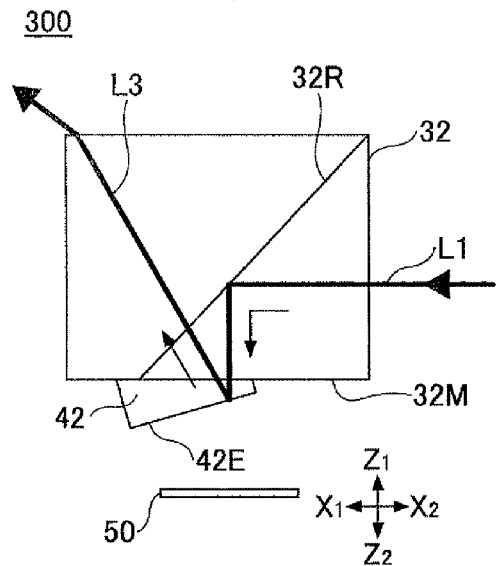
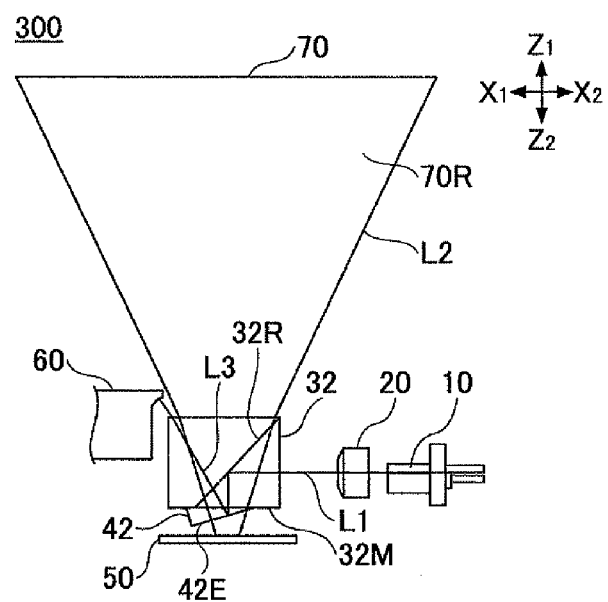

FIG.9A
RELATD ART
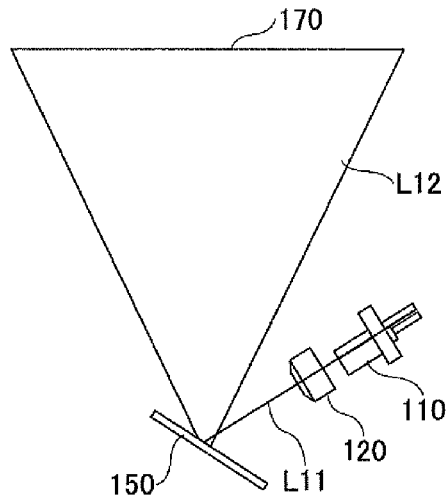
FIG.9B
RELATED ART
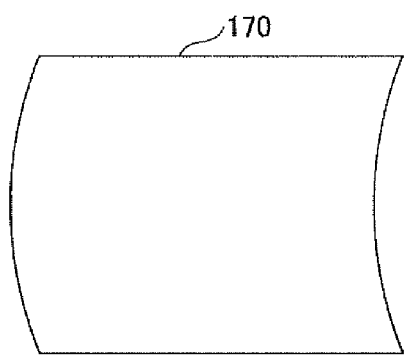
FIG.10 RELATED ART
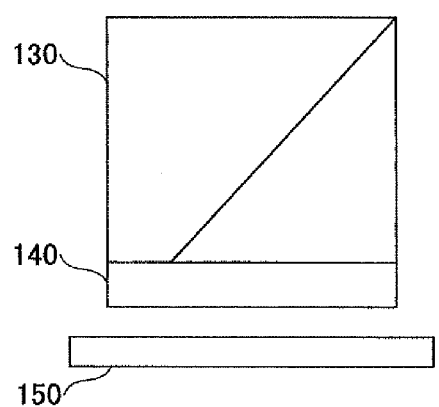
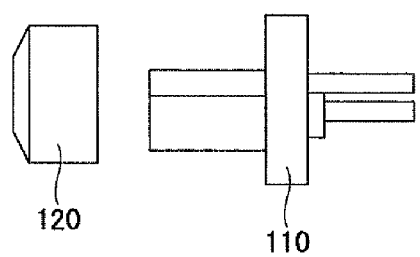

OPTICAL SCANNING APPARATUS

BACKGROUND OF THE INVENTION

1. Field of the Invention

The present invention generally relates to an optical scanning apparatus that includes, for example, a laser source for irradiating a laser beam and a mirror for reflecting the laser beam.

2. Description of the Related Art

As one related art example, there is known an optical scanning apparatus that performs image projection by irradiating a laser beam to a mirror and scanning the laser beam by reflecting the laser beam to a desired direction.

FIGS. 9A-9B are schematic diagrams illustrating an example of an optical scanning apparatus according to a first related art example. FIG. 9A is a plan view illustrating an entire configuration of the optical scanning apparatus according to the first related art example. FIG. 9B is a schematic diagram illustrating a projection plane of the optical scanning apparatus according to the first related art example.

In FIG. 9A, the optical scanning apparatus of the first related art example includes a laser source 110, a collimator lens 120, and a mirror 150. First, a laser beam (laser light) L11 is irradiated from the laser source 110. Then, the laser beam L11 is turned into parallel light by the collimator lens 120 and is guided to the mirror 150. The mirror 150 oscillates vertically (up/down) around a horizontal axis and horizontally (left/right) around a vertical axis. Thereby, the mirror 150 scans the projection plane 170 by reflecting a reflection light L12 (i.e. the incident laser beam L11 reflected by the mirror 150) vertically and horizontally to the projection plane 170.

With the optical scanning apparatus of the first related art example illustrated in FIG. 9A, the laser source 110 and the collimator lens 120 are to be positioned diagonally before (in front of) the mirror 150 in order for the laser beam L11 to be incident to the mirror 150 from a position diagonally before (in front of) the mirror 150. Therefore, the optical scanning apparatus of the first related art example including the laser source 110 and the collimator lens 120 has a problem of taking up a large amount of space and becoming excessively large.

Further, with the optical scanning apparatus of the first related art example illustrated in FIG. 9A, the reflection light L12 reflected from the mirror 150 could not be bilaterally symmetric. As illustrated in FIG. 9B, the reflection light L12 exhibits a projection plane having a distorted shape in a horizontal (left/right) direction. In order to form the projection plane into a rectangle without the distorted shape, it becomes necessary to correct the distorted shape by using software. Thus, correcting the distorted shape leads to a problem of increased manufacturing cost.

In order to solve this problem, an optical scanning apparatus including an optical system illustrated in FIG. 10 is proposed. FIG. 10 is a plan view illustrating an exemplary configuration of an optical system of an optical scanning apparatus according to a second related art example. In the optical scanning apparatus illustrated in FIG. 10, a prism 130 and a wave plate 140 are positioned before (in front of) the mirror 150. The prism 130 has a cuboid shape. The laser source 110 and the collimator lens 120 are positioned at the side of the prism 130. Owing to this configuration, all of the components of the optical scanning apparatus of the second related art example can be positioned in the vicinity of the mirror 150. Thereby, the size of the optical scanning apparatus of the second related art example can be reduced. Further, the laser beam irradiated from the laser source 110 can be reflected by the prism 130, so that the reflected laser beam is perpendicularly incident to the mirror 150.

FIGS. 11A and 11B are schematic diagrams illustrating the optical scanning apparatus of the second related art example. FIG. 11A is a schematic diagram illustrating an entire configuration of the optical scanning apparatus according to the second related art example. FIG. 11B is a schematic diagram illustrating a projection plane of the optical scanning apparatus according to the second related art example.

As illustrated in FIG. 11A, the laser beam L11 irradiated from the laser source 110 becomes a parallel beam by passing through the collimator lens 120 and is perpendicularly incident to an end face of the prism 130 located toward the laser source 110. Then, the laser beam L11 changes direction by being reflected at the inside of the prism 130 and becomes perpendicularly incident to the mirror 150. The beam L12 reflected from the mirror 150 forms a projection plane 171 that is parallel to the mirror 150 and the prism 130. Thereby, an image is displayed. It is to be noted that the waveplate 140 polarizes the laser beam L11 and the reflection light L12, so that the reflection light L12 reflected from the mirror 150 is transmitted through the prism 130 without being reflected by the prism 130.

As illustrated in FIG. 11B, the projection plane 171 of the optical scanning apparatus according to the second related art example has a rectangular shape without any distortion. Thereby, an image can be appropriately projected to the projection plane 171.

Other than the above-described scanning type projector, there is also a projector using a liquid crystal light valve. The projector using the liquid crystal light valve includes an illumination unit that irradiates an illumination beam, an optical modulation unit that modulates the illumination beam from the illumination unit, a reflection type light attenuation filter that is positioned before (in front of) the optical modulation unit and attenuates the strength of the illumination beam incident to the optical modulation unit, and a retaining unit that retains the light attenuation filter in a position inclined at a predetermined angle relative to an optical axis of the illumination beam (see, for example, Japanese Laid-Open Patent Publication No. 2005-141152).

However, the optical scanning apparatus of the second related art example has a problem of stray light being generated at the center of the projection plane 171.

FIG. 12A is a perspective view for describing problems of the optical scanning apparatus according to the second related art example. FIG. 12B is a plan view for describing problems of the optical scanning apparatus according to the second related art example.

As illustrated in FIG. 12A, the optical scanning apparatus of the second related art example has a problem of a point (spot) P generated by stray light L13 at a center area of the projection plane 171 formed by the reflection light L12.

In the optical scanning apparatus of the second related art example illustrated in FIG. 12B, the laser beam L11 propagating to the mirror 150 is reflected by the prism 130. Then, the laser beam L11 reflected from the prism 130 is transmitted through the waveplate 140 and reaches the mirror 150. Although the waveplate 140 includes an end plane 140E having an anti-reflection film (not illustrated), approximately 0.5% of the laser beam L11 is reflected at the end plane 140E. The laser beam L11 reflected at the end plane 140E becomes the stray light L13 and is displayed as the point P at the center of the projection plane 171 regardless of the scanning operation of the mirror 150.

In a case of VGA (Video Graphics Array), the projection plane 171 has a resolution of approximately 300,000 dots (≈640×480) per screen. Accordingly, the light quantity of a single dot of a single screen per unit of time is 1/300,000 of the irradiated beam. In a case where the transmittance of the anti-reflection film (not illustrated) is 99.7%, the light reflected at the end plane 140E of the waveplate 140 has a light quantity of approximately 0.3% (approximately 1/300) of the irradiated beam. In other words, the light quantity of the stray light reflected from the end plane 140E is 300,000/300 (=1,000 times) of the scanning light (reflection light L12). The stray light having such light quantity is a problem that cannot be ignored.

It is to be noted that, unlike the scanning type projector, the above-described projector disclosed in Japanese Laid-Open Patent Publication No. 2005-141152 uses a liquid crystal light valve and includes components such as a light attenuation filter. Thus, the projector disclosed in Japanese Laid-Open Patent Publication No. 2005-141152 can take countermeasures for preventing stray light by using the components. On the other hand, a scanning type projector has fewer components compared to the above-described projector disclosed in Japanese Laid-Open Patent Publication No. 2005-141152 and has fewer components for preventing stray light. Thus, it is difficult to apply the projector disclosed in Japanese Laid-Open Patent Publication No. 2005-141152 to the below-described embodiments of the present invention.

SUMMARY OF THE INVENTION

The present invention provides an optical scanning apparatus that substantially eliminates one or more of the problems caused by the limitations and disadvantages of the related art.

Features and advantages of the present invention will be set forth in the description which follows, and in part will become apparent from the description and the accompanying drawings, or may be learned by practice of the invention according to the teachings provided in the description. Objects as well as other features and advantages of the present invention will be realized and attained by an optical scanning apparatus particularly pointed out in the specification in such full, clear, concise, and exact terms as to enable a person having ordinary skill in the art to practice the invention.

To achieve these and other advantages and in accordance with the purpose of the invention, as embodied and broadly described herein, an embodiment of the present invention provides an optical scanning apparatus including: a laser source configured to irradiate a laser beam; a prism configured to reflect the laser beam irradiated from the laser source; a mirror configured to move the laser beam reflected from the prism by oscillating with respect to a predetermined axis and reflecting the laser beam reflected from the prism, the laser beam reflected from the prism being substantially perpendicular to a plane of the mirror in a case where the mirror is in a non-oscillating state; a waveplate positioned between the prism and the mirror and configured to polarize the laser beam reflected from the prism and the laser beam reflected from the mirror; wherein the waveplate includes an end plane inclined with respect to the laser beam reflected from the prism to the mirror.

Other objects and further features of the present invention will be apparent from the following detailed description when read in conjunction with the accompanying drawings.

BRIEF DESCRIPTION OF THE DRAWINGS

FIG. 5A is a plan view illustrating a first exemplary configuration of a prism and a waveplate of an optical scanning apparatus according to a third embodiment of the present invention;

FIG. 5B is a plan view illustrating a second exemplary configuration of a prism and a waveplate of an optical scanning apparatus according to a third embodiment of the present invention;

FIG. 6 is a plan view illustrating an exemplary configuration of the optical scanning apparatus according to the third embodiment of the present invention;

FIG. 9A is a plan view illustrating an entire configuration of an optical scanning apparatus according to a first related art example;

FIG. 9B is a schematic diagram illustrating a projection plane of the optical scanning apparatus according to the first related art example;

FIG. 10 is a plan view illustrating an exemplary configuration of an optical system of an optical scanning apparatus according to a second related art example;

DESCRIPTION OF THE PREFERRED EMBODIMENTS

Figure 1A:
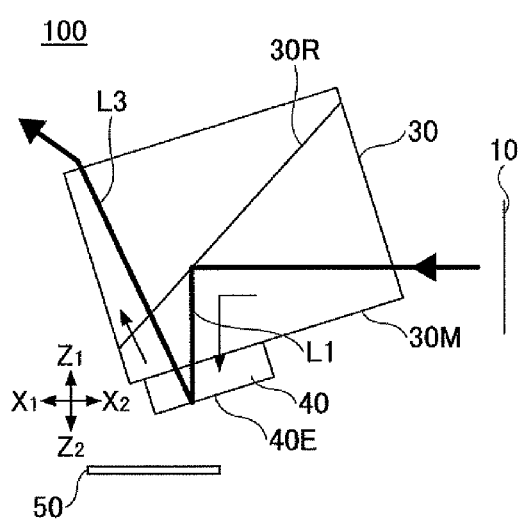
FIG. 1A is a plan view illustrating an exemplary configuration of a prism and a waveplate of an optical scanning apparatus according to a first embodiment of the present invention.

In the following, embodiments of the present invention will be described with reference to the accompanying drawings.
[First Embodiment]
FIG. 1A is a plan view illustrating an exemplary configuration of a prism 30 and a waveplate 40 of an optical scanning apparatus according to the first embodiment of the present invention. The waveplate 40 is provided in contact with the prism 30 at a surface 30M positioned before (in front of) the prism 30. The prism 30 and the waveplate 40 are integrally formed. That is, the prism 30 and the waveplate 40 form a united body. In the first embodiment illustrated in FIGS. 1A and 2, a below-described mirror 50 (see FIG. 2) is provided at a position facing the waveplate 40 and a laser source is provided on the right side of the prism 30.

The prism 30 is an optical part for reflecting a laser beam L1 incident to the prism 30 and guiding the reflected laser beam L1 to the mirror 50. As long as the prism 30 can reflect the incident laser beam L1 and guide the reflected laser beam L1, a polyhedron of various materials and shapes may be used as the prism 30. For example, the prism 30 may be a perpendicular cube shaped prism. In the example illustrated in FIG. 1A, the prism 30 has a cuboid shape. It is to be noted that the prism 30 has a reflection plane 30R provided therein. The prism 30 guides the incident laser beam L1 to the mirror by reflecting the incident laser beam L1 with the reflection plane 30R. The waveplate 40 is a birefringence element that causes a phase shift between perpendicularly intersecting polarization components. In this embodiment, the waveplate 40 polarizes the laser beam L1 and a reflection light (light reflected from the mirror 50) L2 and adjusts the beams L1, L2 so that the reflection light L2 is transmitted through the reflection plane 30R of the prism 30. For example, in a case where there is a phase difference of $\pi$ between the laser beam L1 and the reflected light L2, the reflection plane 30R of the prism 30 reflects the laser beam L1. Further, if the waveplate 40 has a property of allowing the reflected laser beam L2 to transmit through the prism 30, a phase difference of $\pi/2$ is generated when the laser beam L1 is transmitted through the waveplate 40 and a phase difference of $\pi/2$ is further generated when the reflected light L2 is transmitted through the waveplate 40.

An end plane 40E of the waveplate 40 is a plane exposed to the atmosphere. Because the difference between the refraction index of the glass material of the waveplate 40 and the refraction index of the atmosphere is significantly large, the waveplate 40 has a property of easily reflecting the laser beam L1. In other words, although it is desirable that the laser beam L1 incident to the waveplate 40 be irradiated to the mirror 50 by being transmitted through the end plane 40E, the laser beam L1 can be easily reflected due to the large difference of refraction indexes. Supposing a case where a reflected light L2 reflected from the end plane 40E of the waveplate 40 becomes a stray light and is projected to a projection plane, the stray light may form a dot on the projection plane. Such a dot is a problem that cannot be ignored. Although it is preferable to form an anti-reflection film (not illustrated) on the end plane 40E in order to prevent the problem, it is difficult to reduce the stray light to a desired low value even if the anti-reflection film (not illustrated) is formed on the end plane 40E.

Accordingly, as illustrated in FIG. 1A, the plane 30M of the prism 30 contacting the waveplate 40 and the end plane 40E positioned toward the mirror 50 are inclined with respect to the optical axis of the laser beam L1 incident to the mirror 50. Thereby, stray light L3 reflected from the end plane 40E propagates in a direction deviating to the left side with respect to the optical axis of the light incident to the mirror 50. Further, the stray light L3 emitted out from the prism 30 propagates further toward the left side with respect to the optical axis of the light incident to the mirror 50. Thereby, the stray light L3 propagates in a direction unrelated to the projection plane.

Accordingly, even in a case where a stray light is generated at the end plane 40E of the waveplate 40, the stray light can be guided to a direction unrelated to the projection plane by arranging the end plane 40E of the waveplate 40 in a position inclined with respect to the laser beam L1. Therefore, the stray light L3 can be prevented from forming a point (spot) P on the projection plane.

Figure 1B:
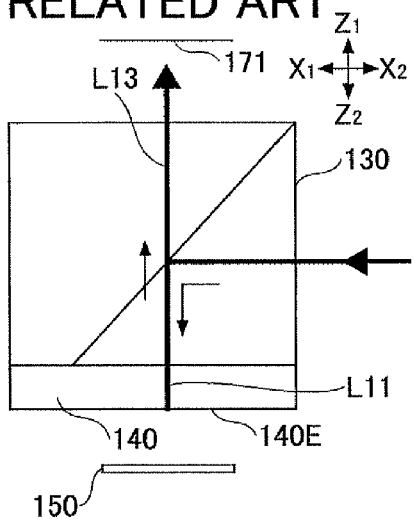
FIG. 1B is a schematic view illustrating an exemplary configuration of a prism and a waveplate of an optical scanning apparatus according to a related art example.
Figure 12A:
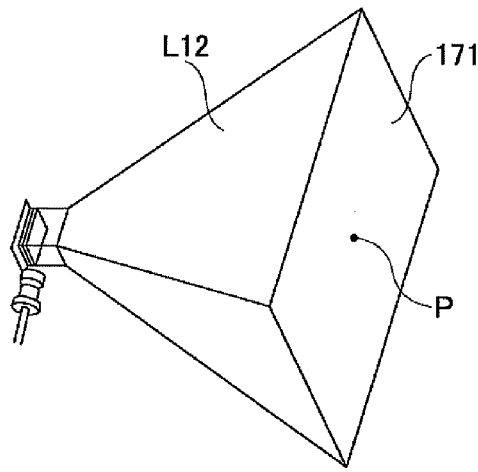
FIG. 12A is a perspective view for describing problems of the optical scanning apparatus according to the second related art example.
Figure 12B:
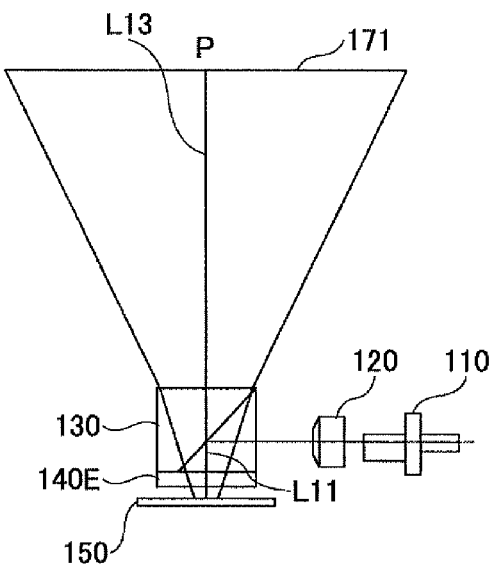
FIG. 12B is a plan view for describing problems of the optical scanning apparatus according to the second related art example.

As a comparative example, FIG. 1B illustrates the above-described optical scanning apparatus of the related art example (also see FIGS. 12A and 12B) in which the waveplate 140 of the cuboid prism 130 and the end plane 140E of the waveplate 140 are positioned perpendicular with respect to the laser beam L11 incident to the mirror 150. Even if a reflection prevention film were to be formed on the end plane 140E of the waveplate 140, stray light L13 would be generated due to the difference of refraction indexes between the waveplate 140 and the atmosphere. Because the end plane 140E and the projection plane 171 are perpendicular with respect to each other, the generated stray light L13 propagates toward the projection plane 171. As a result, a point P is formed on the projection plane 171 by the stray light L13 (see FIG. 12B).

With the optical scanning apparatus according to the above-described first embodiment of the present invention, the stray light L3 can be prevented from being optically projected to the projection plane by positioning the end plane 40E of the waveplate 40 inclined with respect to the optical axis of the laser beam L1 incident to the mirror 50.

Figure 2:
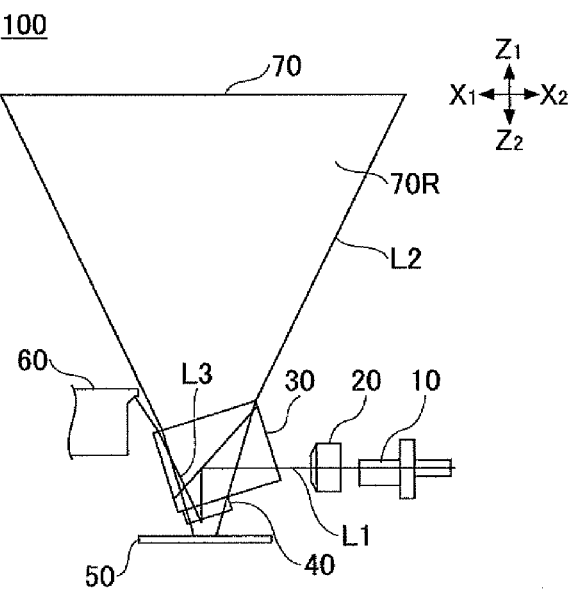
FIG. 2 is a plan view illustrating an exemplary configuration of the optical scanning apparatus according to the first embodiment of the present invention.

FIG. 2 is a plan view illustrating an exemplary configuration of the optical scanning apparatus according to the first embodiment of the present invention. In FIG. 2, the optical scanning apparatus of the first embodiment includes a laser source 10, a collimator lens 20, the prism 30, the waveplate 40, the mirror 50, and a light absorbing part 60. Further, a projection plane 70 is formed before (in front of) the optical scanning apparatus.

In FIG. 2, the laser source 10 and the collimator lens 20 are positioned at the right side of the prism 30 and configured to allow the laser beam L1 to be irradiated from a horizontal direction (i.e. X1-X2 direction (left/right direction)). The horizontal direction (X1-X2 direction) is parallel to the mirror 50 when the mirror 50 is in a non-oscillating state (i.e. a static state where the mirror 50 is not oscillating) as illustrated in FIG. 2. Further, the mirror 50 is positioned facing the prism 40. Further, the light absorbing part 60 is positioned at the front left side of the prism 30. The light absorbing part 60 may be positioned in a projection region 70R in which a boundary of the projection region is defined by the reflection light L2 reflected from the mirror 50 via the waveplate 40.

The light absorbing part 60 may also be positioned outside of the projection region 70R (in this embodiment, left side of the projection region 70R). Further, the projection plane 70 is formed at the front of the mirror 50 and positioned a predetermined distance apart from the mirror 50. Further, the projection plane 70 is positioned parallel to the mirror 50 when the mirror 50 is in the non-oscillating state.

The laser source 10 generates the laser beam L1 and outputs (irradiates) the generated laser beam L1. Various kinds of laser beams (including a laser beam in a visible region) may be used as the laser beam L1 according to intended purpose.

The collimator lens 20 is for gathering diverging rays and turning the diverging rays into parallel rays (parallel light). Accordingly, because the laser beam L1 irradiated from the laser source 10 includes diverging rays, the diverging rays of the laser beam L1 are gathered and turned into parallel rays.

The prism 30 is for reflecting the incident laser beam L1 irradiated from the laser source 10 and guiding the reflected laser beam L1 to the mirror 50. In view of the laser beam L1 incident to the reflection plane 30R of the prism 30 satisfying a relationship of an incident angle (angle of incidence)=a reflection angle, the reflection plane 30R of the prism 30 is arranged in a position so that the optical axis of the laser beam L1 incident to the mirror 50 becomes substantially perpendicular to the mirror 50. In the first embodiment, the shape of the prism 30 is a typical cuboid. The prism 30 is used as it is and is not subject to any kind of processing (shaping). Because other details of the prism 30 illustrated in FIG. 2 are substantially the same as those described with reference to FIG. 1A, other details of the prism 30 are omitted.

The waveplate 40 is for polarizing the laser beam L1 transmitted through the prism 30 and guided to the mirror 50 and polarizing the reflection light L2 reflected from the mirror (i.e. reflection of the laser beam L1 incident to the mirror 50) and adjusting the polarization of the laser L1 and the reflection light L2 so that the reflection light L2 is transmitted through the prism 30. Predetermined polarization conditions are set for achieving such polarization and adjustment of the polarization. Because other details of the waveplate 40 illustrated in FIG. 2 are substantially the same as those described with reference to FIG. 1A, other details of the waveplate 40 are omitted.

The mirror 50 is for reflecting the laser beam L1 incident to the mirror 50 and scanning the reflection light L2 on the projection plane 70. Accordingly, the mirror 50 is provided in a manner capable of oscillating around one or two axes (i.e. horizontal axis and/or vertical axis). In the embodiment illustrated in FIG. 2, the mirror 50 is configured to oscillate in a horizontal direction (i.e. left/right direction, X1-X2 direction), so that scanning can be performed on the projection plane 70 by moving the reflection light L2 in the horizontal direction (i.e. left/right direction, X1-X2 direction). Accordingly, the axis for the scanning in the horizontal direction (first axis) is provided in a vertical direction (i.e. direction perpendicular with respect to the horizontal direction, Y1-Y2 direction). In a case of scanning the projection plane 70 in the vertical direction in addition to scanning in the horizontal direction, scanning is performed by moving the reflection light L2 in the vertical direction (i.e. direction perpendicular with respect to the horizontal direction, Y1-Y2 direction), another axis (second axis) may be provided in the horizontal direction. It is preferable for the first and second axes to be the center axes of the mirror 50 that travel through the center of the mirror 50.

The light absorbing part 60 is for absorbing the stray light L3. As described above with reference to FIG. 1A, although the stray light L3 reflected from the end plane 40E can be guided in a different direction away from the projection plane 70, it is not desired for the stray lights L3 to form a spot(s) at the periphery of the projection plane 70. Accordingly, the stray light L3 is guided to and absorbed by, for example, the light absorbing part 60, such as a housing/cover (not illustrated) of the optical scanning apparatus 100. Accordingly, not only is the stray light L3 prevented from adversely affecting the projection plane 70 but also a peripheral region surrounding the projection plane 70.

Accordingly, the light absorbing part 60 is provided at a location through which the stray light L3 travels. Thus, the light absorbing part 60 may be provided according to necessity for positively preventing the stray light L3 from adversely affecting the projection plane 70. In the embodiment illustrated in FIG. 2, the light absorbing part 60 is provided as an independent component of the optical scanning apparatus 70. Alternatively, a housing (not illustrated) or a cover (not illustrated) of the optical scanning apparatus 100 may be used as the light absorbing part 60.

Various images are projected on the projection plane 70. In this embodiment, the projection plane 70 is a landscape (horizontal) plane in which the ratio of the horizontal side to the vertical side of the projection plane 70 is, for example, 4:3 or 16:9. In this embodiment, scanning is performed on the projection plane 70 in a horizontal direction. The horizontal direction (X1-X2) in FIG. 2 is the scanning direction of the optical scanning apparatus 100 according to the first embodiment of the present invention.

Hence, with the above-described first embodiment of the optical scanning apparatus 100, the projection plane 70 can be prevented from being adversely affected by the stray light L3 by appropriately setting the prism 30 and the waveplate 40 in the above-described positions.

[Second Embodiment]

Figure 3:
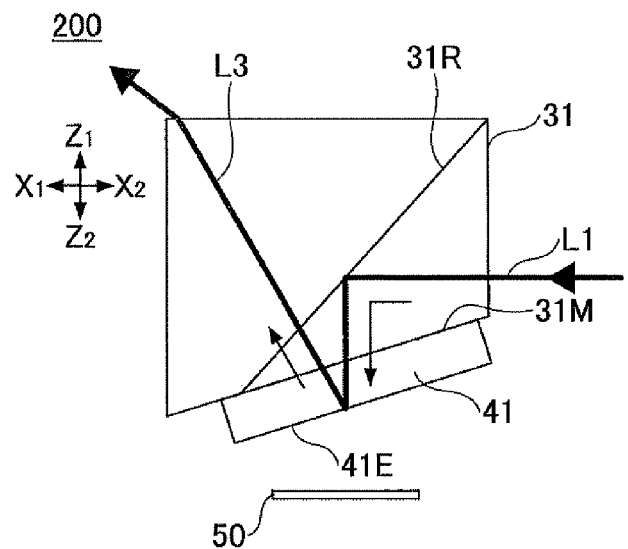
FIG. 3 is a plan view illustrating an exemplary configuration of a prism and a waveplate of an optical scanning apparatus according to a second embodiment of the present invention.

FIG. 3 is a plan view illustrating an exemplary configuration of a prism 31 and a waveplate 41 of an optical scanning apparatus 200 according to the second embodiment of the present invention. It is to be noted that, in the second embodiment of the present invention, like components/elements are denoted with like reference numerals as those of the first embodiment and are not further described.

The optical scanning apparatus 200 illustrated in FIG. 3 includes the prism 31 and the waveplate 41. In this embodiment, the prism 31 is a deformed prism. More specifically, the prism 30 of the first embodiment has a cuboid shape whereas the prism 31 of the second embodiment has a trapezoidal column shape. In this embodiment, the prism 31 has a plane 31M situated toward the mirror 50 (i.e. the plane of the prism 31 contacting the waveplate 41). The plane 31M is inclined with respect to the optical axis of the laser beam L1 incident to the mirror 50. The trapezoidal cylinder shape of the prism 31 may be obtained by diagonally cutting the cuboid prism 30 of the first embodiment along a plane situated toward the mirror 50.

The prism 31 includes a reflection plane 31R that is positioned 45 degrees with respect to the incident direction of the laser beam L1 irradiated from the laser source 10. Accordingly, in this embodiment, by irradiating the laser beam L1 to the prism 31 perpendicularly to the right side of the prism 31, the laser beam L1 is reflected from the reflection plane 31R and is guided toward the mirror 50. Thereby, the reflected laser beam L1 is perpendicularly incident to the mirror 50.

The waveplate 41 is adhered to the plane 31M of the prism 31. The waveplate 41 and the prism 31 are integrally formed. That is, the waveplate 41 and the prism 31 form a united body. In this embodiment, the waveplate 41 has a tabular shape having a predetermined thickness. By adhering the waveplate 41 to the inclined plane 31M, an end plane 41E of the waveplate 41 becomes inclined with respect to the optical axis of the laser beam incident to the mirror 50. Thereby, as illustrated in FIG. 3, the stray light L3 reflected from the end plane 41E can be diverted away from the projection plane 70. In this embodiment, the stray light L3 is diverted to the left side of the projection plane 70. Accordingly, the stray light L3 can be prevented from adversely affecting the projection plane 70.

Accordingly, by forming the prism 31 in a trapezoidal cylinder shape having the plane 31M inclined with respect to the laser beam L1 incident to the mirror 50 and adhering the plane 31M to the waveplate 41, the end plane 41E can be arranged in parallel with the plane 31M. Thereby, the end plane 41E becomes a plane inclined with respect to the optical axis of the laser beam L1 incident to the mirror 50. As a result, the stray light L3 can be diverted from the projection plane 70.

Figure 4:
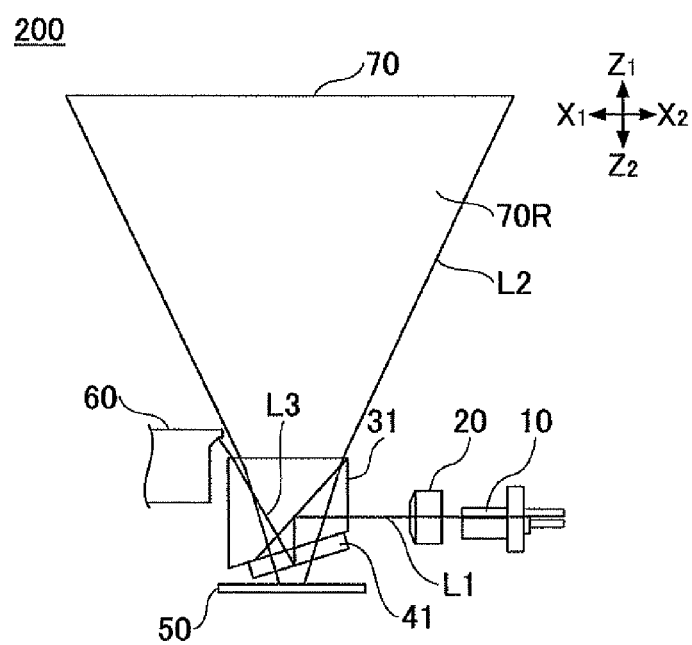
FIG. 4 is a plan view illustrating an exemplary configuration of the optical scanning apparatus according to the second embodiment of the present invention.

FIG. 4 is a plan view illustrating an exemplary configuration of the optical scanning apparatus 200 according to the second embodiment of the present invention. The components of the optical scanning apparatus 200 of the second embodiment are substantially the same as those of the optical scanning apparatus 100 of the first embodiment except for the prism 31 and the waveplate 41. That is, similar to the optical scanning apparatus 100 of the first embodiment, the optical scanning apparatus 200 of the second embodiment includes the laser source 10, the collimator lens 20, the mirror 50, and the light absorbing part 60. Further, similar to the optical scanning apparatus 100 of the first embodiment, the optical scanning apparatus 200 of the second embodiment has the projection plane 70 provided on the front side facing the mirror 50. The configurations of the prism 31 and the waveplate 41 illustrated in FIG. 3 are the same as those described above with reference to FIG. 3. The optical scanning apparatus 200 of the second embodiment also has the light absorbing part 60 positioned, for example, within the projection range 70R formed by the reflection light L2 reflected from the mirror 50 via the waveplate 41 or outside of the projection range 70R (located on the left side of the projection range in the embodiment illustrated in FIG. 4). Thereby, the light absorbing part 60 of the optical scanning apparatus 200 of the second embodiment can absorb the stray light L3. Thus, the projection plane 70 of the optical scanning apparatus 200 of the second embodiment can be prevented from being adversely affected by the stray light L3. Similar to the first embodiment, the housing (not illustrated) or the cover (not illustrated) of the optical scanning apparatus 200 of the second embodiment may be alternatively used as the light absorbing part 60 for absorbing the stray light L3.

Hence, the optical scanning apparatus 200 of the second embodiment can prevent the projection screen 70 from being adversely affected by the stray light L3 by using the trapezoidal cylinder shaped prism 31.

[Third Embodiment]

FIG. 5A is a plan view illustrating a first exemplary configuration of a prism 32 and a waveplate 42 of an optical scanning apparatus 300 according to the third embodiment of the present invention. FIG. 5B is a plan view illustrating a second exemplary configuration of a prism 32 and a waveplate 42 of an optical scanning apparatus 300 according to the third embodiment of the present invention. It is to be noted that, in the third embodiment of the present invention, like components/elements are denoted with like reference numerals as those of the first and second embodiments and are not further described.

The optical scanning apparatus 300 illustrated in FIG. 5A includes the prism 32 having a cuboid shape and the waveplate 42 having a wedge shape. The waveplate 42 includes a triangular cross-section. Further, the waveplate 42 has a triangular side plane adhered to a plane 32M (i.e. plane of prism 30 located toward the mirror 50) of the prism 30. Thereby, an end plane 42E of the waveplate 42 serves as a plane inclined with respect to the optical axis of the laser beam L1 incident to the mirror 50. Thus, the stray light L3 reflected from the end plane 42E is significantly diverted away from the projection plane 70 (in this embodiment, diverted toward the left side of the projection plane 70). Accordingly, the stray light L3 can be prevented from adversely affecting the projection plane 70.

Although the waveplate 42 illustrated in FIG. 5A is shaped as a wedge, the waveplate 42 may alternatively be formed in a shape of a trapezoidal cylinder by cutting off a tip of the wedge as long as the laser beam L1 can be transmitted through the inclined end plane 42E of the waveplate 42 as illustrated in FIG. 5B.

FIG. 6 is a plan view illustrating an exemplary configuration of the optical scanning apparatus 300 according to the third embodiment of the present invention. The components of the optical scanning apparatus 300 of the third embodiment are substantially the same as those of the optical scanning apparatuses 100, 200 of the first and second embodiments except for the prism 32 and the waveplate 42. That is, similar to the optical scanning apparatuses 100, 200 of the first and second embodiments, the optical scanning apparatus 300 of the third embodiment includes the laser source 10, the collimator lens 20, the mirror 50, and the light absorbing part 60. Further, similar to the optical scanning apparatuses 100, 200 of the first and second embodiments, the optical scanning apparatus 300 of the third embodiment has the projection plane 70 provided on the front side facing the mirror 50. In the third embodiment, a cuboid-shaped prism 32 is used, and the plane 32M of the prism 32 situated toward the mirror 50 is parallel to an incident surface (i.e. plane of the mirror 50 to which the laser beam L1 reflected from the prism 32 is incident) of the mirror 50 when the mirror 50 is in a non-oscillating state as illustrated in FIG. 6. Accordingly, the reflection plane 32R of the prism 32 is positioned 45 degrees with respect to the incident plane of the mirror 50 when the mirror 50 is in the non-oscillating state as illustrated in FIG. 6. Thereby, the reflection plane 32R can reflect the incident laser beam L1 to the mirror 50 in a manner such that the optical axis of the reflected laser beam L1 is perpendicular to the mirror 50. Further, because the wedge-shaped waveplate 42 has the end plane 42E inclined with respect to the incident plane of the mirror 50 and also with respect to the optical axis of the laser beam L1 incident to the incident plane of the mirror 50, the stray light L3 reflected from the end plane 42E can be absorbed by the light absorbing part 60. Similar to the first and second embodiments, the light absorbing part 60 is positioned, for example, within the projection region 70R formed by the reflected light L2 reflected from the mirror 50 via the waveplate 42 or outside of the projection region 70R (located on the left side of the projection region 70R in the embodiment illustrated in FIG. 6).

With the optical scanning apparatus 300 according to the above-described third embodiment of the present invention, the stray light L3 can be prevented from adversely affecting the projection plane 70 by forming the waveplate 42 in a wedge shape (or a trapezoidal cylinder shape) and positioning the end plane 42E in a manner inclined with respect to the incident plane of the mirror 50 and also with respect to the optical axis of the laser beam L1 incident to the incident plane of the mirror 50.

[Fourth Embodiment]

Figure 7A:
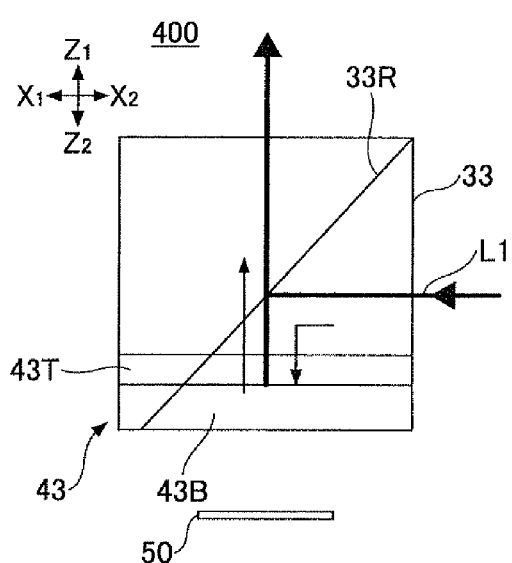
FIG. 7A is a plan view illustrating an exemplary configuration of a prism and a waveplate of an optical scanning apparatus according to a fourth embodiment of the present invention.
Figure 7B:
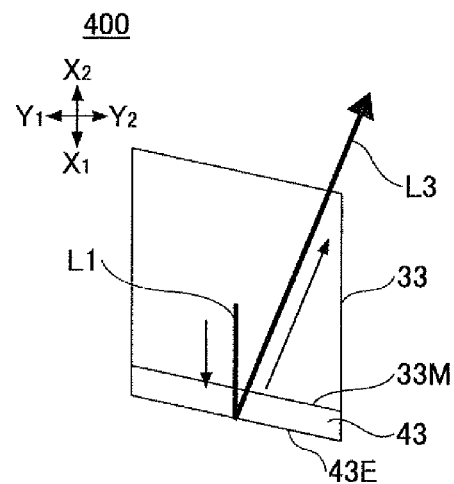
FIG. 7B is a side view illustrating an exemplary configuration of the prism and the waveplate of the optical scanning apparatus according to the fourth embodiment of the present invention.

FIGS. 7A and 7B are schematic diagrams illustrating an optical scanning apparatus 400 including a prism 33 and a waveplate 43 according to a fourth embodiment of the present invention. FIG. 7A is a plan view illustrating an exemplary configuration of the prism 33 and the waveplate 43 of the optical scanning apparatus 400 according to the fourth embodiment of the present invention. FIG. 7B is a side view illustrating an exemplary configuration of the prism 33 and the waveplate 43 of the optical scanning apparatus 400 according to the fourth embodiment of the present invention. It is to be noted that, in the fourth embodiment of the present invention, like components/elements are denoted with like reference numerals as those of the first, second, and third embodiments and are not further described.

The prism 33 according to the fourth embodiment is a deformed prism. The upper plan configuration of the prism 33 is substantially the same as the upper plan configuration of the above-described cuboid-shaped prism 32. In other words, the top configuration of the prism 33 has a rectangular shape and has a plane 33R forming an angle of 45 degrees with respect to the optical axis of the incident laser beam L1 irradiated from the laser source 10 and with respect to the mirror 50 in the non-oscillating state. Accordingly, the incident laser beam L1 irradiated from the laser source 10 to the right side of the prism 33 can be perpendicularly incident to the mirror 50.

However, unlike the waveplates 40-42 of the above-described first-third embodiments, the waveplate 43 has an upper surface 43T and a bottom surface 43B that are not completely superposed on top of each other as illustrated in FIG. 7A. Because the upper surface 43T and the bottom surface 43B of the waveplate 43 are not superposed on top of each other, both the upper surface 43T and a part of the bottom surfaces 43B are illustrated in FIG. 7A (plan view illustrating an exemplary configuration of the prism 33 and the waveplate 43 of the optical scanning apparatus 400 of the fourth embodiment).

FIG. 7B illustrates a side view corresponding to FIG. 7A (plan view). The prism 33 has a side plane formed in a shape of a parallelogram. A waveplate 43 also has a side plane provided along an inclined plane of the prism 33 and formed in a shape of a parallelogram. According to FIGS. 7A and 7B, the prism 33 is shaped as a rectangular column. The prism 33 extends in a direction perpendicular to the incident plane of the mirror 50 where the mirror 50 is in a non-oscillating state. The prism 33 has upper and lower planes facing each other and aligned parallel to each other. The prism 33 including the parallelogram side plane has left and right planes that are inclined a predetermined angle with respect to a vertical direction (Y1-Y2 direction). The prism 33 has a plane 33M that is situated toward the mirror 50 and arranged facing downward. The waveplate 43 is adhered to the plane 33M. Thereby, the waveplate 43 is inclined in the same manner as the plane 33M. The waveplate 43 has an end plane 43E that is inclined in the same manner as the plane 33M and arranged facing toward the mirror 50.

The laser beam L1 incident to the prism 33 is reflected inside the prism 33. The reflected laser beam L1 propagating toward the mirror 50 is reflected by the end plane 43E and becomes stray light L3. Due to the inclination of the end plane 43E, the stray light L3 is reflected downward by the end plane 43E. Accordingly, the stray light L3 can be diverted downward below the projection plane 70. Thereby, the stray light L3 can be prevented from forming a point P on the projection plane 70. Hence, by having the end plane 43E inclined downward (or upward), the stray light L3 can be prevented from adversely affecting the projection plane 70.

Figure 8:
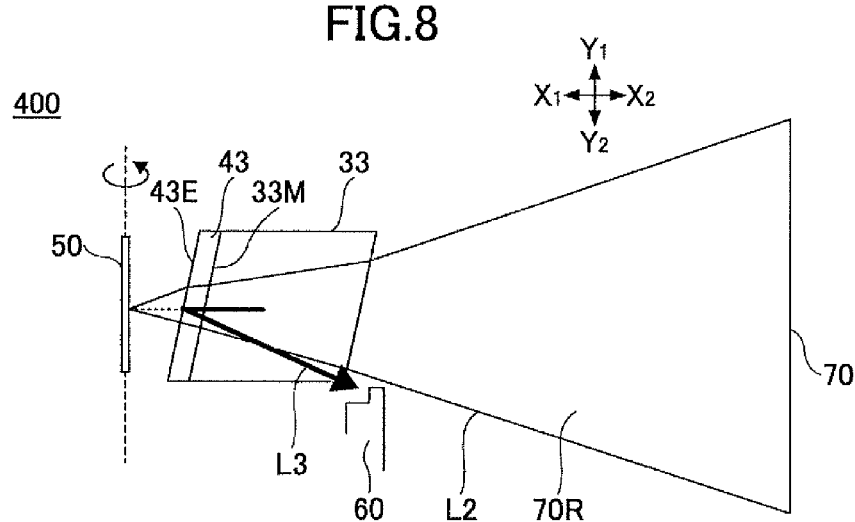
FIG. 8 is a side view illustrating an exemplary configuration of the optical scanning apparatus according to the fourth embodiment of the present invention.
Figure 11A:
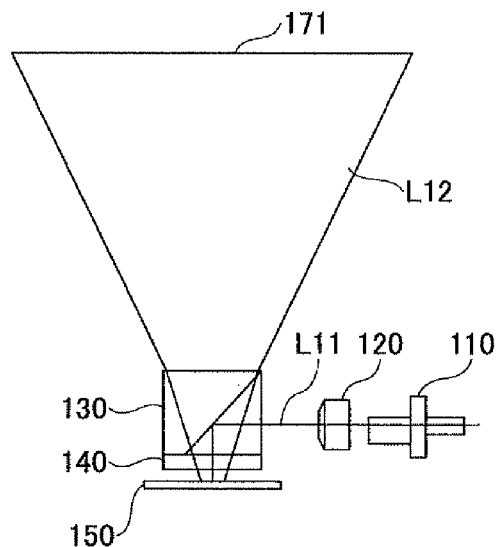
FIG. 11A is a schematic diagram illustrating an entire configuration of the optical scanning apparatus according to the second related art example.
Figure 11B:
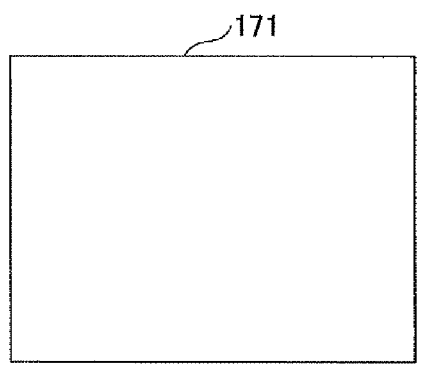
FIG. 11B is a schematic diagram illustrating a projection plane of the optical scanning apparatus according to the second related art example.

FIG. 8 is a side view illustrating an exemplary configuration of the optical scanning apparatus 400 according to the fourth embodiment of the present invention. In addition to having the prism 33 and the waveplate 43, the optical scanning apparatus 400 illustrated in FIG. 8 also includes the mirror 50 and the light absorbing part 60. The projection plane 70 according to the fourth embodiment is situated at the front of the optical scanning apparatus 400. Similar to the optical scanning apparatuses 100, 200, 300 of the first, second, and third embodiments, the optical scanning apparatus 400 of the fourth embodiment also includes the laser source 10 (not illustrated) and the collimator lens 20 (not illustrated).

In the optical scanning apparatus 400 of the fourth embodiment, the laser beam L1 incident to the mirror 50 is reflected by the mirror 50. The optical scanning apparatus 400 scans the reflected light L2 on the projection plane 70 by oscillating the mirror 50. Although the laser beam L1 reflected by the end plane 43E becomes stray light L3, the stray light L3 can be reflected downward because the end plane 43E faces downward. Thereby, the reflected stray light L3 can be absorbed by the light absorbing part 60 located at a position lower than the prism 33. The light absorbing part 60 is positioned, for example, within a projection region 70R formed by the reflected light L2 reflected from the mirror 50 via the end plane 43E of the waveplate 43 or outside of the projection region 70R (located below the projection range in the embodiment illustrated in FIG. 8). By providing the light absorbing part 60 in the above-described position, a spot P can be prevented from appearing, for example, at an area below the projection plane 70.

Although the optical scanning apparatus 400 according to the fourth embodiment illustrated in FIGS. 7A, 7B, and 8 has the end plane 43E facing downward, the optical scanning apparatus 400 may alternatively have the end plane 43E facing upward and have the light absorbing part 60 located at a position higher than the prism 33.

Although the optical scanning apparatus 400 according to the fourth embodiment illustrated in FIGS. 7A, 7B, and 8 includes the waveplate 43 having a side plane shaped as a parallelogram, the optical scanning apparatus 400 may alternatively use a typical waveplate having a tabular shape and adhere the waveplate 43 to the plane 33M of the prism 33 situated toward the mirror 50. As long as the tabular waveplate has an even (uniform) thickness, the waveplate 43 having other various shapes can be used by adhering the waveplate 43 along the plane 33M. This is because the waveplate 43 can have substantially the same inclination as the plane 33M by adhering the waveplate 43 along the plane 33M.

In the optical scanning apparatus 400 of the fourth embodiment, the inclination angle of the waveplate 43 can be reduced compared to that of the waveplates 40, 41, 42 of the first, second, and third embodiments. This is because the stray light can be diverted from the projection plane 70 with a small inclination angle since the projection plane 70 of the fourth embodiment typically has a horizontal length (length in the horizontal direction) greater than a vertical length (length in the vertical direction) of the projection plane 70.

In general, it is difficult for an optical scanning apparatus having a typical configuration to perform scanning by moving a reflection light L2 on a projection plane in a horizontal direction (scanning direction) at a high speed while adjusting color components of red (R), green (G), and blue (B) so that R, G, B can be evenly distributed on the projection plane. However, because the waveplate 43 of the fourth embodiment is inclined in a direction different from the scanning direction, there is an advantage in that the scanning of the reflection light L2 has little effect on the adjustment of R, G, and B.

With the optical scanning apparatus 400 according to the fourth embodiment, the end plane 43E serves as a plane inclined with respect to the laser beam L1 incident to the mirror 50 by having the end plane 43E inclined upward or downward (i.e. direction perpendicular to the scanning direction). Thereby, the stray light L3 generated at the end plane 43E is diverted to a position above or below the projection plane 70. Thus, the projection plane 70 can be prevented from being adversely affected by the stray light L3.

In the above-described first, second, and third embodiments, the stray light L3 is diverted in a horizontal direction (X1-X2 direction). In the above-described fourth embodiment, the stray light L3 is diverted in a vertical direction (Y1-Y2 direction). However, by rotating the components of the optical system of the first-fourth embodiments except for the mirror 50 at an angle of 90 degrees, the direction in which the stray light L3 is diverted can be switched from the vertical direction to the horizontal direction, or vice-versa. In other words, with the first, second, and third embodiments, the stray light L3 can be diverted to an area above or below the projection plane 70 by positioning the laser source 10 and the collimator lens 20 above or below the prism 30, 31, 32, by rotating the prism 30, 31, 32, the waveplate 40, 41, 42 at an angle of 90 degrees, and not changing the position of the mirror 50. Similar to the first, second, and third embodiments, with the fourth embodiment, the stray light L3 can be diverted to the left side or the right side of the projection plane 70 by performing the 90 degree rotation.

Hence, with the above-described embodiment of the present invention, stray light generated at the end plane of the waveplate can be diverted to direction different from the projection plane to which reflection light is irradiated.

With the above-described embodiment of the present invention, consumption of space of the optical scanning apparatus can be reduced by integrating the waveplate and the prism into a united body.

With the above-described embodiment of the present invention, adjustments of position can be made without having to process the shape of the cuboid shaped prism for preventing stray light. Thus, prevention of stray light can be achieved easily at a low cost.

With the above-described embodiment of the present invention, the reflection plane of the prism can be set to 45 degrees with respect to the mirror by using the trapezoidal cylinder shaped prism. Thus, distortion of the projection plane can be prevented while still being able to prevent stray light.

With the above-described embodiment of the present invention, a compact size, inexpensive optical scanning apparatus that prevents stray light can be obtained by processing the waveplate into the above-described configuration.

With the above-described embodiment of the present invention, stray light can be prevented without having to use a prism and/or a waveplate having a complicated shape. By the parallogram shape with two horizontal planes facing each other, stray light can be diverted in a direction perpendicular to the projection plane. Thus, stray light can be positively diverted away from the projection plane with a small amount of inclination.

With the above-described embodiment of the present invention, stray light can be diverted away from the projection plane in a horizontal direction of the projection plane.

With the above-described embodiment of the present invention, stray light can be diverted away from the projection plane in a vertical direction of the projection plane. Thus, in a case where the shape of the projection plane is a landscape shape, the amount of movement of stray light can be reduced, to thereby, facilitate the prevention of stray light.

With the above-described embodiment of the present invention, the light absorbing part can absorb stray light and prevent stray light from appearing on the projection plane. Thus, desired image can be projected without any stray light.

Further, the present invention is not limited to these embodiments, but variations and modifications may be made without departing from the scope of the present invention.

The present application is based on Japanese Priority Application No. 2010-186377 filed on Aug. 23, 2010, with the Japanese Patent Office, the entire contents of which are hereby incorporated by reference.

What is claimed is:

1. An optical scanning apparatus comprising:
a laser source configured to irradiate a laser beam;
a prism configured to reflect the laser beam irradiated from the laser source;
a mirror configured to move the laser beam reflected from the prism by oscillating with respect to a predetermined axis and reflecting the laser beam reflected from the prism, the laser beam reflected from the prism being incident to a plane of the mirror;
a waveplate positioned external to the prism, between the prism and the mirror, having a top plane parallel to and in contact with an end plane of the prism and configured to polarize the laser beam reflected from the prism and the laser beam reflected from the mirror;
wherein the waveplate includes an end plane inclined with respect to the laser beam reflected from the prism to the mirror.

2. The optical scanning apparatus as claimed in claim 1, wherein the waveplate is integral with the prism.

3. The optical scanning apparatus as claimed in claim 1, wherein the waveplate is adhered to the prism.

4. The optical scanning apparatus as claimed in claim 2, wherein the prism has a cuboid shape, and wherein the prism includes an incident plane that is inclined with respect to the laser beam irradiated from the laser source.

5. The optical scanning apparatus as claimed in claim 2, wherein the prism has a trapezoidal cylinder shape, wherein the prism includes an incident plane that is perpendicular with respect to the laser beam irradiated from the laser source, and wherein a plane of the prism toward the mirror is inclined with respect to the plane of the mirror in the case where the mirror is in the non-oscillating state.

6. The optical scanning apparatus as claimed in claim 2, wherein the prism has a cuboid shape, wherein a plane of the prism toward the mirror is parallel to the plane of the mirror in the case where the mirror is in the non-oscillating state, wherein the waveplate has a wedge shape, and wherein one side of the wedge shape is adhered to the prism.

7. The optical scanning apparatus as claimed in claim 2, wherein the prism has a cuboid shape, wherein a plane of the prism toward the mirror is parallel to the plane of the mirror in the case where the mirror is in the non-oscillating state, wherein the waveplate has a trapezoidal cylinder shape, and wherein one side of the trapezoidal cylinder shape is adhered to the prism.

8. The optical scanning apparatus as claimed in claim 2, wherein the prism has a rectangular column shape, wherein the prism includes a side plane having a parallelogram shape, wherein the prism is positioned parallel to the plane of the mirror in the case where the mirror is in the non-oscillating state, and wherein the waveplate has a tabular shape having a uniform thickness.

9. The optical scanning apparatus as claimed in claim 1, wherein the waveplate is inclined with respect to a direction in which the mirror moves the laser beam reflected from the prism.

10. The optical scanning apparatus as claimed in claim 1, wherein the waveplate is perpendicular with respect to a direction in which the mirror moves the laser beam reflected from the prism.

11. The optical scanning apparatus as claimed in claim 1, further comprising:
a light absorbing part positioned within a projection range formed by the laser beam reflected from the mirror via the end plate of the waveplate.

12. The optical scanning apparatus as claimed in claim 1, further comprising:
a light absorbing part positioned outside of a projection range formed by the laser beam reflected from the mirror via the end plate of the waveplate.

* * * * *